No. 829,813. PATENTED AUG. 28, 1906.
W. D. VANBIBBER & B. T. PRIGMORE.
FORK RACK OR SUPPORT.
APPLICATION FILED OCT. 21, 1905.
2 SHEETS—SHEET 2.
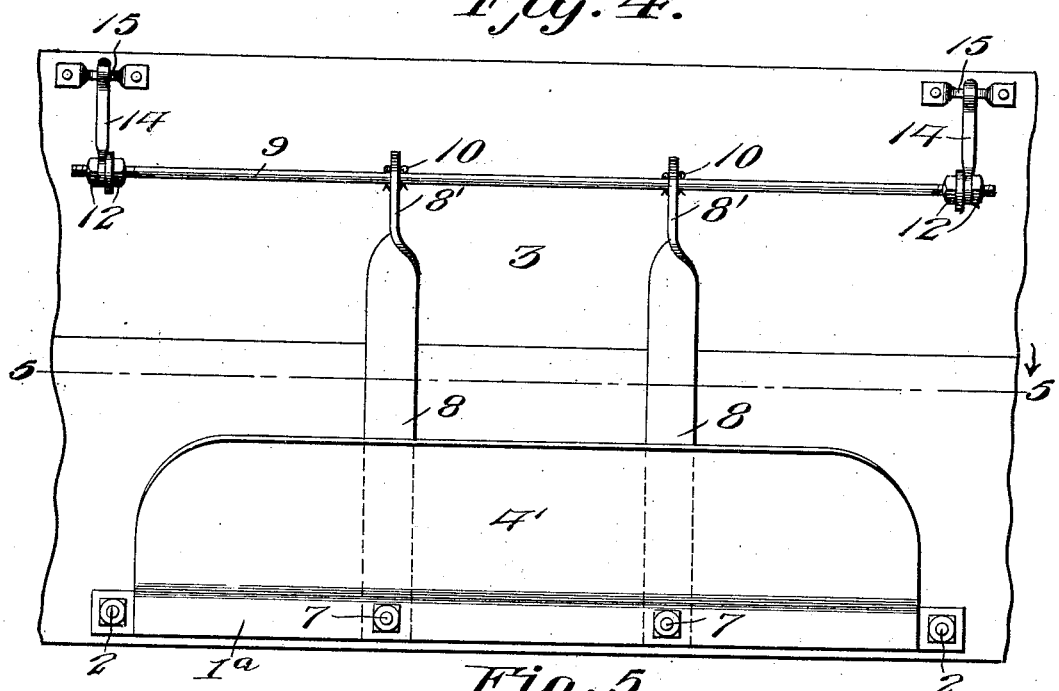
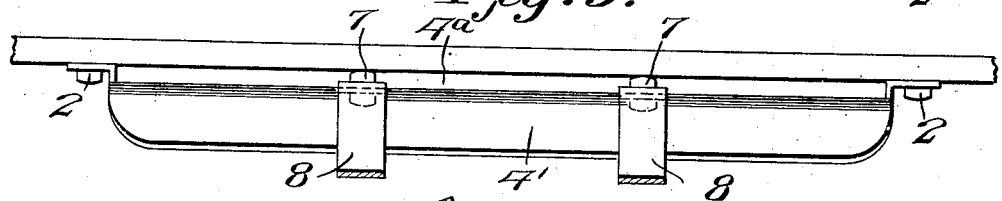
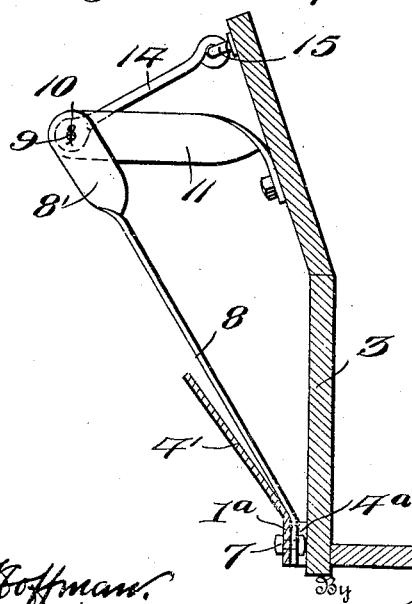
Witnesses
Frank B. Hoffman
C. C. Hines
Inventors
W. D. Vanbibber,
B. T. Prigmore.
By Victor J. Evans
Attorney

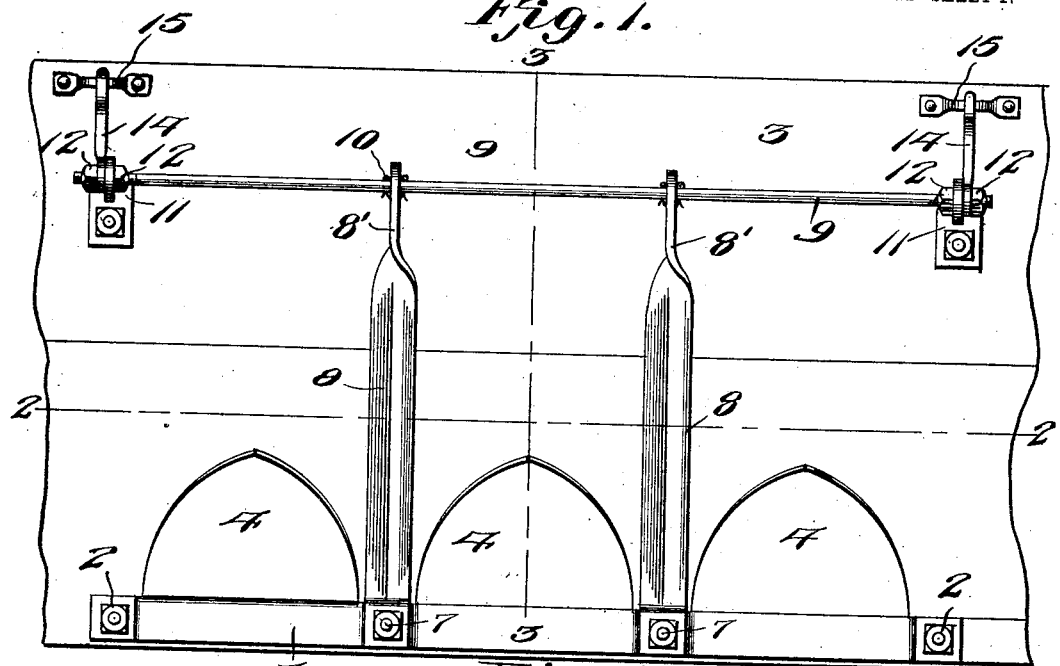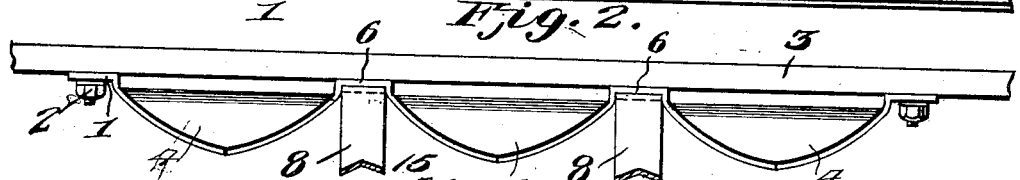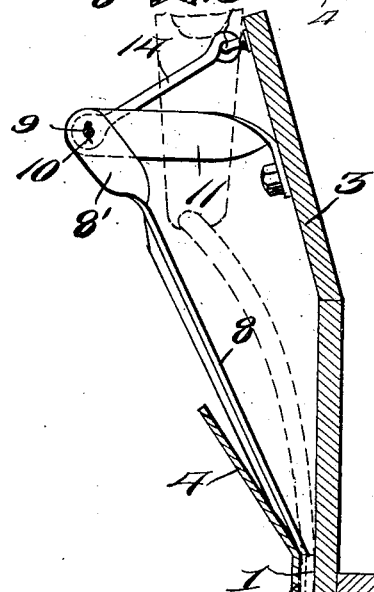

UNITED STATES PATENT OFFICE.

WILLIAM D. VANBIBBER AND BEN T. PRIGMORE, OF SWEET SPRINGS, MISSOURI.

FORK RACK OR SUPPORT.

No. 829,813.　　　　Specification of Letters Patent.　　　　Patented Aug. 28, 1906.

Application filed October 21, 1905. Serial No. 283,810.

*To all whom it may concern:*

Be it known that we, WILLIAM D. VANBIBBER and BEN T. PRIGMORE, citizens of the United States of America, residing at Sweet Springs, in the county of Saline and State of Missouri, have invented new and useful Improvements in Fork Racks or Supports, of which the following is a specification.

This invention relates to a fork rack or support adapted for application to the self-feeders of grain separators or hullers, and has for its object to provide a simple and effective construction of rack whereby a fork may be supported in convenient position to be removed for use by the pitchers or drivers of grain-delivery wagons, thus enabling the driver of a delivery-wagon to remove a fork for use and after the delivery of the load to replace the fork, so that it can be readily reached by the driver or pitcher of the succeeding delivery-wagon, thereby obviating the annoyance and loss of time occasioned by the necessity of the driver waiting for some one to hand him a fork and to take it from him after use.

In the drawings hereto annexed and forming a part of this specification, Figure 1 is an elevational view showing the application of the invention to a portion of the frame of a feeder. Fig. 2 is a top plan view showing the main supporting-strip and supporting-plates applied to the feeder-frame and with the standards shown in section, the section being taken on the line 2 2 of Fig. 1. Fig. 3 is a vertical section taken on the line 3 3 of Fig. 1. Figs. 4, 5, and 6 are views similar to Figs. 1, 2, and 3 and show a modification.

The device embodies a metallic supporting strip or strap 1, apertured at its ends for the passage of bolts or other suitable fastenings 2 for securing it in a horizontal position upon one of the side walls 3 of the feeder, which side wall is employed to form the body or back of the rack. Formed at suitable intervals upon said strip or strap are guide-plates 4, extending outwardly therefrom at a suitable inclination. In the construction shown in Figs. 1 to 3, inclusive, we have shown the use of three such guide-plates spaced apart from each other and from the ends of the supporting-strap, and between said plates the strap 1 is offset to form keeper-loops 6 to receive the lower ends of supporting or bracing standards 8. Each of these standards is preferably formed of a flat strip of metal fastened at its lower end to the loop 6 and feeder-wall 3 by a bolt or other suitable fastening 7 and having its upper end quarter twisted to lie at right angles thereto and to the wall 3, as shown at 8'. The portions of the strip or strap 1 to which the guide-plates 4 are attached are spaced from the lower portion of the wall 3 to form guide and keeper passages 4ª to receive the tapered tines of a fork which fit therein and extend downwardly therethrough in the manner shown in Fig. 3. The upper ends 8' of the standards 8 are apertured for the passage of a bar or rod 9, which latter is formed with transverse openings for the reception of cotter-pins or keys 10, located on opposite sides of the part 8' to hold the upper ends of the stays or standards from movement thereon. The ends of the rod or bar 9 pass through bracket-arms 11, bolted to the wall 3 and extending outwardly therefrom and are threaded for the reception of nuts 12 to secure the rod against endwise movement. These nuts may also be utilized to secure the ends of the rod to the outer ends of inclined stays or braces 14, which are apertured for the reception of the rod and are connected at their upper ends to loops 15, secured to the wall 3 above the bracket-arms 11, thus firmly attaching the device to the feeder-frame, so that it will support the weight of a number of forks.

In practice the fork to be supported is inserted, fork end downward and with the concave side of the body of the fork outward, through the stays between the wall 3 of the feeder and the rod 9, and the tines of the fork come into contact with the inclined plates 4 and are guided thereby downward to the passages 4ª. A continued downthrust on the fork is exerted until, through the tapering form of the tines, the latter are caused to bind or wedge in the passages 4ª, and thereby fasten the body of the fork in position. When the body of the fork is provided with a straight handle, the handle will extend upwardly between the wall 3 and rod 9 and will bear against the upper edge of the outwardly-inclined upper section of the wall, as shown in Fig. 3. Where, however, the fork is provided with a bent or curved handle, the latter will project outwardly and rest against the rod 9, and the fork will thereby be supported in position. Thus the arrangement of the parts is such as to form a rest or stay for a fork-handle of either form to prevent the strain or weight of the handle falling upon the tines. The device may be constructed to receive one or more forks, and the handle of the fork will project upwardly, so as to be conveniently grasped by the driver or pitcher on a grain-delivery wagon driven alongside the feeder. This will obviate the necessity of the driver descending from his wagon to pick up a fork and avoid the loss of time occasioned by the necessity of the driver waiting for some one to hand him a fork and to take it from him after use. After use the fork is replaced in the rack, so that it may be readily removed by the driver or pitcher of the succeeding delivery-wagon.

In the embodiment of the invention shown in Figs. 4, 5, and 6 the construction of the upper portion of the device is the same as that shown in Figs. 1, 2, and 3, but the lower portion is differently constructed. As shown, a single continuous guide-plate 4', extending the full length of the supporting strip or strap 1ª, is employed, and the strap 1ª is spaced from the wall of the feeder between its secured ends. The lower ends of the standards 8 in this construction fit between the strip and wall 3 and are fastened thereto by bolts 7, as in the construction shown in Figs. 1, 2, and 3. The operation in this case is the same as that previously described, the plate 4' acting as a guide to conduct the tined end of the fork to the passage 4ª.

Having thus described the invention, what is claimed as new is—

1. A fork-rack comprising a back, a holding member secured thereto and forming a space to receive the tines of a fork, a rest secured to the back above said holding member, and means for reinforcing the rest from the holding member.

2. A fork-rack comprising a back, a holding member secured thereto and forming a passage for the reception of the tines of a fork, said holding member having an inclined guide leading to said passage, a rest secured to the back above the holding member, and means for staying the rest from the holding member.

3. In a fork-support, the combination with the wall of a feeder or like support, of a fork-body-supporting member secured to said wall and spaced therefrom to form a passage to receive the tines of a fork, said member being provided with an outwardly-inclined guide-plate, and a fork-handle rest secured to the wall above said body-supporting member.

4. In a fork-rack, a fork-body-supporting member provided with means of attachment to a wall or like support and adapted to form an intervening passage for the reception of the tines of a fork, a fork-handle rest provided with means of attachment to the support and adapted to lie above said body-supporting member, and reinforcing connections between the body-supporting member and handle-rest.

5. A fork-rack comprising a back having an outwardly-inclined upper portion, a holding member secured to the back and forming a passage for the reception of the tines of a fork, a rest arranged above said holding member and below the upper edge of the inclined portion of the back, and means for staying the rest from said holding member.

6. A fork-rack comprising a back, a holding member secured to the back and forming a plurality of passages for the reception of tines of forks, a rest secured to the back above said holding member and common to said plurality of passages, and stay members for reinforcing the rest from the holding member.

7. A fork-rack comprising a fork-body-holding member comprising an attaching portion adapted to be secured to the wall of a feeder and spaced therefrom to form a passage for the reception of the tines of a fork and having an outwardly-inclined guide-plate leading to said passage, a fork-handle-supporting bar disposed above said body-supporting member, connections between said bar and body-supporting member, and means for attaching the bar to and holding it outwardly from the wall of the feeder.

8. A fork-rack comprising a back, a holding-strip secured thereto and forming a plurality of passages to receive the tines of forks, inclined guides upon the holding member leading to said passages, a handle-rest secured to the back above the holding member and continuous above the set of passages, and means for staying said rest from the holding member.

9. A fork-rack comprising a back, a holding-strip secured to the back and spaced therefrom to form a plurality of intervening passages for the reception of the times of forks, a rest-rod secured to the back above said holding-strips, and a plurality of stays connecting the rod with the holidng-strip.

10. A fork-rack comprising a support, a holding member attached to said support and forming a passage for the reception of the tines of a fork, a guide member upon the holding member inclined to said passage, a handle-rest disposed above and outwardly beyond the plane of said passage, and means for supporting said rest from the back and holding member.

In testimony whereof we affix our signatures in presence of two witnesses.

WILLIAM D. VANBIBBER.
BEN T. PRIGMORE.

Witnesses:
A. E. SMITH,
F. B. McGREW.